Patented Sept. 29, 1953

2,653,963

UNITED STATES PATENT OFFICE 2,653,963

CATALYTIC ADDITION OF CYANOGEN HALIDES TO OLEFINS

Frank M. Cowen, Norwalk, and James K. Dixon, Riverside, Conn., assignors to American Cyanamid Company, New York, N. Y., a corporation of Maine No Drawing. Application April 12, 1951, Serial No. 220,726

14 Claims. (Cl. 260—464)

The present invention relates to a novel method of preparing nitriles.

It is an object of the invention to prepare nitriles by reacting a cyanogen halide with an olefin in the presence of a catalyst. It is a further object of the invention to prepare halonitriles and/or unsaturated nitriles by the aforesaid reaction. It is a still further object to prepare nitriles from inexpensive raw materials.

Various attempts to react cyanogen halides with olefins have been made in the past without success. The present invention is based on the fact that the addition is made in the presence of a catalyst. The preferred catalyst for the reaction is a complex resulting from the admixture of aluminum chloride with nitrobenzene. However, various other catalysts may be used such as the complex resulting from the combination of aluminum chloride with nitromethane or aluminum bromide with nitromethane or nitrobenzene, or boron fluoride with nitromethane or nitrobenzene. It has been found that the complex resulting by admixing an aluminum halide or boron fluoride with a nitrohydrocarbon will catalyze the reaction.

In carrying out the reaction, the temperature determines generally whether the main product is a halonitrile or an unsaturated nitrile. When the product desired is the halonitrile it is preferred to carry out the reaction below 25° C. On the other hand, when unsaturated nitriles are desired the temperature is preferably above 25° C., and even more preferably about 25°–55° C. In either case the reaction product is generally a mixture of halonitriles and unsaturated nitriles, which products can be separated and recovered by fractional distillation. Depending on the nitrile mainly desired, the reaction can be conducted at temperatures as low as 0° C., or even lower, and as high as the boiling point of the nitrohydrocarbon used (for example, as high as 255° C.). Some unsaturated nitrile is generally obtained (along with halonitrile) below 25° C., and some halonitrile is generally obtained (along with unsaturated nitrile) above 25° C.

The overall reaction contemplated proceeds as follows:

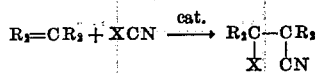

in which each R is hydrogen, paraffinic hydrocarbon residue, or a terpenyl residue, and the R's can be the same or different, and can be joined to form a cyclo-olefin, and X is either chlorine or bromine.

It is also postulated that the reactions may proceed as follows:

(1) 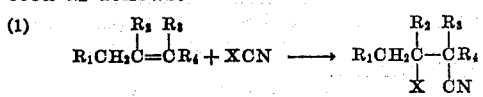

then (2) 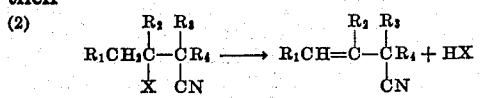

Or, in some cases where $R_3$ is H, (3) 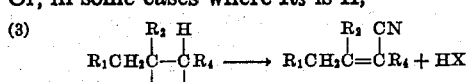

In the Equations 1, 2 and 3 each R is hydrogen, a paraffinic hydrocarbon residue, or a terpenyl residue, and the R's can be the same or different, and can be joined to form a cyclo-olefin, and X is either chlorine or bromine.

The invention also contemplates the addition of cyanogen chloride or bromide to substituted olefins in which the substituent groups do not affect the activity of the double bond to any marked degree, as for example, the halo-olefins and the like.

In the course of the reaction various side products are formed. The various components in the final reaction mass are conveniently separated from each other by fractional distillation.

The β-chloronitriles are useful intermediates in the preparation of polymers, the β-chlorocarboxy acids, and α-β-unsaturated acid derivatives.

The unsaturated nitriles are useful intermediates in the preparation of polymers, for example guanamine resins, and unsaturated carboxy acids. The nitriles are also effective as selective solvents for separating the components of lubricating oils.

The following examples illustrate but do not limit the invention.

EXAMPLE 1

Addition of cyanogen chloride to 2-butene

To a suspension of 180 g. (1.35 mols) of aluminum chloride in 250 cc. of carbon disulfide, cooled by a water bath, is added 68 cc. (1.25 mols) of nitromethane, slowly, in several portions. The suspension is stirred rapidly throughout the addition. The aluminum chloride gradually passes into solution and the result is a 2-phase catalyst solution. The preparation of the catalyst solution is conveniently carried out in the reaction vessel in which the cyanogen chloride and olefin are to be reacted. In this particular example, a 1-liter 3-necked round bottom flask can be used.

After the aluminum chloride dissolves, the thus-formed 2-phase catalyst solution is cooled to 0° to 10° C., and one mol (52 cc.) of cyanogen chloride is vaporized into the solution. The cyanogen chloride is conveniently fed from liquid cyanogen chloride contained in a graduated cylinder and may be vaporized into the catalyst mixture through a glass inlet tube. Immediately following the addition of cyanogen chloride, 2-butene is bubbled into the mixture through a sintered glass disc as rapidly as possible, while still maintaining the temperature below 10° C. The mixture is stirred as by an electrically driven stirrer placed directly over the sintered disc. A thermometer is inserted into one of the necks together with a condenser, to which is attached a drying tube filled with a desiccant. The whole assembly is preferably placed in a well-ventilated area.

After 1½ hours the addition of olefin is discontinued, but the reaction mixture is kept at 0°–5° C. for 5 hours and then the temperature is allowed to rise slowly to room temperature overnight with stirring.

The product is worked up in a manner analogous to Friedel-Crafts reaction masses, e. g., the product is poured, with stirring, over a liter of cracked ice containing a little concentrated hydrochloric acid to hydrolyze the product-catalyst complex. (It is not absolutely necessary that the HCl be present, but it accelerates hydrolysis.) After standing for about an hour, the carbon disulfide-product layer is separated from the aqueous layer. The latter is extracted with three 150-cc. portions of ether and the ether extracts and carbon disulfide-product layer combined and dried over a desiccant.

The product is filtered free of drying agent and subjected to a low pressure distillation until all ether and carbon disulfide has been removed. The brown oil (110 g.) that remains is distilled through a 1 x 12 inch rectifying column with the following results:

| Cut | B. P., °C. | P. mm. Hg | Wt. (g.) | Product |
|---|---|---|---|---|
| 1 | 28 | 32 | 7 | Nitromethane. |
| 2 | 37 | 30 | 2 | cis-2-Methylcrotononitrile. |
| 3 | 49–50 | 30 | 2 | trans-2-Methylcrotononitrile. |
| 4 | 69–73 | 15–16 | 51 | 3-Chloro-2-methylbutyronitrile. |
| High boilers and residue. | >67 | 3–4 | 48 | Mixture of nitrile polymers and olefin polymers, useful as resin or wetting agent intermediates. |

The 51 g. of 3-chloro-2-methylbutyronitrile recovered in Example 1 corresponds to a yield of 43%.

In each of the herein examples cyanogen bromide is substitutable for cyanogen chloride, and vice versa.

Using a procedure analogous to that of Example 1, various other beta-halonitriles can be prepared. The following table is illustrative of a few of the olefins, solvents, and products, together with the yield in each instance.

BETA-CHLORONITRILES PRODUCED BY THE ADDITION OF CYANOGEN CHLORIDE TO OLEFINS (details infra)

| Olefin | Solvent | Product(s) | Yield, Percent | B. P., °C./mm.Hg |
|---|---|---|---|---|
| Propylene | $CS_2$ | $CH_3CHClCH_2CN$ | 6 | 59–61/11.5. |
| 1-Butene | excess $CH_3NO_2$ | $CH_3CH_2CHClCH_2CN$ | 18 | 59–59.5/5–6. |
| 2-Butene | $CS_2$ | $CH_3CHClCH(CN)CH_3$ | 43 | 55/5–6. |
| Cyclohexene | Monochlorobenzene. | trans [cyclohexane with CN and Cl] | 15 | 79/2–3. |
| | | cis | 15 | 90–92/3. |
| 1-Octene | $CS_2$ | $CH_3(CH_2)_5CHClCH_2CN$ | 9 | 88–89/1.5. |
| 1-Dodecene | $CS_2$ | $CH_3(CH_2)_9CHClCH_2CN$ | 8 | 114–6/1. |

UNSATURATED NITRILES PRODUCED BY THE ADDITION OF CYANOGEN CHLORIDE TO OLEFINS (details infra)

| Olefin | Product(s) | Yield, Percent | B. P., °C./mm.Hg |
|---|---|---|---|
| Propylene | cis+trans $CH_3CH=CHCN$ | 1 | 111–6. |
| 1-Butene | cis+trans $CH_3CH_2CH=CHCN$ | 7 | 125–143. |
| 2-Butene | cis+trans $CH_3CH=CCN$ with $CH_3$ | 5 | 122–130. |
| Cyclohexene | [cyclohexene-CN] | 21 | 54/3. |
| 1-Octene | cis+trans $CH_3(CH_2)_5CH=CHCN$ | 6 and 9, resp. | 58/2 and 68–70/2, resp. |
| 1-Dodecene | cis+trans $CH_3(CH_2)_9CH=CHCN$ | 4 and 5, resp. | 86–88/1 and 98/99/1, resp. |

EXAMPLE 2

*Preparation of beta-chlorobutyronitrile and crotononitrile by addition of cyanogen chloride to propylene under pressure*

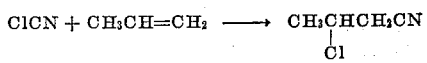

A previously prepared, cold solution of 90 g. of anhydrous aluminum chloride, 75 ml. of nitromethane, and 25 ml. (0.5 mol) of cyanogen chloride is poured into a 300 ml. precooled (5°-10° C.) autoclave. The autoclave is closed, and 60 g. of propylene slowly introduced into it at a temperature ranging from 20°-35° C. over a period of 3½ hours. The pressure during this time varies within the range of 18-123 p. s. i. The autoclave is then cooled, vented, and opened, and the product is removed and poured on a mixture of ice and concentrated hydrochloric acid. The mixture is stirred and extracted with ether. The ether extracts are separated, shaken with a cold sodium hydroxide solution, and dried over a sodium sulfate desiccant. The residual ether and nitromethane are removed by distillation, and the remaining product comprises 7.5 g. (15%) yield of β-chlorobutyronitrile, B. P. 63°-64° C./13 mm. and 2 g. (6%) yield of cis- and trans-crotononitrile, B. P. up to 40° C./55 mm. This recovery thus represents a total yield of 21% of identifiable nitrile, based on the amount of cyanogen chloride used as a starting reactant.

EXAMPLE 3

*Addition of cyanogen chloride to cyclohexene*

To a suspension of 90 g. (0.675 mol) of aluminum chloride in 150 cc. of monochlorobenzene, cooled by a water bath at about room temperature, is added 48 cc. of nitromethane slowly with stirring, following which the aluminum chloride dissolves. The solution is then cooled to about 0°-10° C. and 28 m. (0.55 mol) of cyanogen chloride vaporized into this solution through a submerged inlet tube. Immediately thereafter the addition of 0.5 mol of cyclohexene through a dropping funnel is begun, and is continued for about 1½ hours, while stirring the mixture and maintaining it at a temperature below 10° C. Thereafter no more cyclohexene is added, and the temperature of the reaction mass is permitted to rise slowly to room temperature. The product is then poured, with stirring, over a liter of cracked ice containing a little concentrated hydrochloric acid. The chlorobenzene-product layer is separated from the aqueous layer, the latter is extracted with ether, and the ether extracts and the chlorobenzene-product layer are combined and dried over a desiccant. The product is filtered and 1-chloro-2-cyanocyclohexane separated therefrom by fractional distillation. Yield, 15% of the trans-isomer and 15% of the cis-isomer. 1-cyanocyclohexene is also separated from the product by fractional distillation in a yield of 21%.

EXAMPLE 4

*Preparation of β-chlorobutyronitrile and crotononitrile*

To a suspension of 180 g. (1.35 mols) of aluminum chloride in 250 cc. of carbon disulfide, cooled by a water bath, is added 68 cc. (1.25 mols) of nitromethane, slowly with stirring, following which the aluminum chloride dissolves. The solution is then cooled to 0°-10° C., and one mol (52 cc.) of cyanogen chloride vaporized into the solution through a submerged inlet tube. Immediately thereafter the addition of the propylene through a sintered glass disc is begun, and is continued for about 1½ hours, while stirring the mixture and maintaining it below 10° C. Thereafter no more propylene is added, and the temperature of the reaction mass is permitted to rise slowly to room temperature. The product is then poured, with stirring, over a liter of cracked ice containing a little concentrated hydrochloric acid. The carbon disulfide-product layer is separated from the aqueous layer, the latter is extracted with ether, and the ether extracts and the carbon disulfide-product layer are combined and dried over a desiccant. The product is filtered and β-chlorobutyronitrile is separated therefrom by fractional distillation in a yield of 6%. Crotononitrile (cis and trans) is also separated from the product by fractional distillation in a yield of 1%.

EXAMPLE 5

*Preparation of β-chlorovaleronitrile and pentenonitrile*

In some instances better yields are obtained without the use of additional solvent (such as carbon disulfide or monochlorobenzene), and the reaction may be conducted using an excess of a nitrohydrocarbon as a solvent.

A catalyst solution is prepared by dissolving 180 g. (1.35 mols) of aluminum chloride in 100 cc. of nitromethane. The solution is cooled to a temperature of 0°-10° C. and one mol (52 cc.) of cyanogen chloride is vaporized into the solution through a submerged inlet tube. Immediately thereafter the addition of 1-butene through a sintered glass disc is begun, and is continued for about 1½ hours, while stirring the mixture and maintaining it below 10° C. Thereafter no more 1-butene is added, and the temperature of the reaction mass is permitted to rise slowly to room temperature. The product is then poured, with stirring, over a liter of cracked ice containing a little concentrated hydrochloric acid. The carbon disulfide-product layer is separated from the aqueous layer, the latter is extracted with ether, and the ether extracts and the carbon disulfide-product layer are combined and dried over a desiccant. The product is filtered and β-chlorovaleronitrile is separated therefrom by fractional distillation. Yield, 18%. A mixture of cis- and trans-2-pentenonitrile is also separated by fractional distillation. Yield, 7%.

EXAMPLE 6

*Preparation of β-chloropelarogononitrile and nonenonitrile*

To a suspension of 180 g. (1.35 mols) of aluminum chloride in 150 cc. of carbon disulfide, cooled by a water bath, is added 75 cc. of nitromethane, slowly with stirring, following which the aluminum chloride dissolves. The solution is then cooled to 0°-10° C., and 56 cc. (1.1 mols) of cyanogen chloride is vaporized into the solution through a submerged inlet tube. Immediately thereafter the addition of 112 g. (1 mol) of 1-octene through a dropping funnel is begun, and is continued for about 1 hour, while stirring the mixture and maintaining it below 10° C. Thereafter no more octene is added, and the temperature of the reaction mass is permitted to rise slowly to room temperature. The product is then poured, with stirring, over a liter of cracked ice containing a little concentrated hydrochloric acid. The carbon disulfide-product layer is separated from the aqueous layer, the latter is extracted with ether, and the ether extracts and the carbon disulfide-product layer are combined and dried over a desiccant. The product is filtered and β-chloropelarogononitrile is separated therefrom by fractional distillation. Yield, 9%. A mixture of cis- and trans-2-nonenonitrile is also separated therefrom by fractional distillation. Yield, 15%.

EXAMPLE 7

*Preparation of β-chlorotridecanonitrile and tridecenonitrile*

To a suspension of 180 g. (1.35 mols) of aluminum chloride in 150 cc. of carbon disulfide, cooled by a water bath, is added 75 cc. of nitromethane, slowly with stirring, following which the aluminum chloride dissolves. The solution is then cooled to 0°–10° C. and 1.1 mols (56 cc.) of cyanogen chloride is vaporized into this solution through a submerged inlet tube. Immediately thereafter the addition of 168 g. (1 mol) of 1-dodecene through a dropping funnel is begun, and is continued for about 1 hour, while stirring the mixture and maintaining it at a temperature below 10° C. Thereafter no more dodecene is added, and the temperature of the reaction mass is permitted to rise slowly to room temperature. The product is then poured, with stirring, over a liter of cracked ice containing a little concentrated hydrochloric acid. The carbon disulfide-product layer is separated from the aqueous layer, the latter is extracted with ether, and the ether extracts and the carbon disulfide-product layer combined and dried over a desiccant. The product is filtered and β-chlorotridecanonitrile separated therefrom by fractional distillation. Yield, 8%. A mixture of cis- and trans-2-tridecanonitrile is also separated therefrom by fractional distillation. Yield, 9%.

EXAMPLE 8

*Addition of cyanogen bromide to dipentene*

To a suspension of 360 g. (1.35 mols) of aluminum bromide in 150 cc. of carbon disulfide is added 75 cc. of nitromethane, slowly with stirring, following which the aluminum bromide dissolves. One mol (106 g.) of cyanogen bromide powder is added to the solution and immediately thereafter the addition of dipentene is begun through a dropping funnel.

One mol of dipentene is thus added dropwise, with stirring. The reaction is then discontinued, the product is poured, with stirring, over a liter of cracked ice containing a little concentrated hydrochloric acid. The carbon disulfide-product layer is separated from the aqueous layer, the latter is extracted with ether, and the ether extracts and the carbon disulfide-product layer combined and dried over a desiccant. The product is filtered and a mixture of the various addition products of the following formulae is separated from the residual mass by fractional distillation.

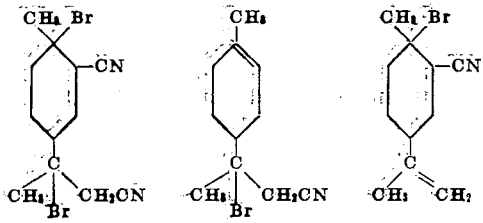

EXAMPLE 9

*Addition of cyanogen bromide to dipentene*

To a suspension of 360 g. (1.35 mols) of aluminum bromide in 250 cc. of carbon disulfide is added 68 cc. (1.25 mols) of nitromethane, slowly with stirring, following which the aluminum bromide dissolves. One mol (106 g.) of cyanogen bromide powder is added to the solution and immediately thereafter the addition of dipentene is begun through a dropping funnel.

One mol of dipentene is thus added dropwise, with stirring. The reaction is then discontinued, the product is poured, with stirring, over a liter of cracked ice containing a little concentrated hydrochloric acid. The carbon disulfide-product layer is separated from the aqueous layer, the latter is extracted with ether, and the ether extracts and the carbon disulfide-product layer combined and dried over a desiccant. The product is filtered and a mixture of various unsaturated cyanodipentenes separated from the residual mass by fractional distillation.

EXAMPLE 10

*Preparation of 2-bromo-1-cyanocyclohexane and cyanocyclohexene*

While it is generally preferred to conduct the addition of cyanogen bromide to an olefin in the presence of an additional solvent, it is not absolutely necessary, as shown by the following example.

1 mol (106 g.) of cyanogen bromide is added to a cooled solution of 360 g. (1.35 mols) of aluminum bromide in 400 cc. of nitrobenzene, slowly with stirring. The mixture is cooled to 0°–10° C. and 102 cc. (1 mol) of cyclohexene is added dropwise through a dropping funnel, with stirring over a period of ½ hour. The stirring is continued for 4 hours at 0°–10° C. after the addition is complete, and then overnight at room temperature. The resulting reaction mass is then poured, with stirring over a liter of cracked ice containing a little concentrated hydrochloric acid. The resultant aqueous layer is extracted with ether and dried over a desiccant. The product is then filtered and 2-bromo-1-cyanocyclohexane and cyanocyclohexene are obtained therefrom by fractional distillation.

EXAMPLE 11

*Preparation of β-bromopelarogononitrile and nonenonitrile*

To a solution of 360 g. (1.35 mols) of aluminum bromide in 100 cc. of nitromethane is added 106 g. (1 mol) of cyanogen bromide, with stirring. 112 g. (1 mol) of 1-octene is added dropwise through a dropping funnel with stirring, over a period of approximately one hour at 0°–5° C. After the addition is complete, the stirring is continued for 4 hours at 0°–10° C. and then overnight at room temperature. The product is poured, with stirring, over a liter of cracked ice containing a little concentrated hydrochloric acid. The aqueous layer is extracted with ether, the ether extract is dried over a desiccant, and the product is filtered and β-bromopelarogononitrile and nonenonitrile are separated therefrom by fractional distillation.

EXAMPLE 12

*Preparation of 2-bromo-1-cyanocyclohexane and cyanocyclohexene*

To a suspension of 360 g. (1.35 mols) of aluminum bromide in 250 cc. of carbon disulfide is added 200 cc. of nitrobenzene, with stirring, following which the aluminum bromide dissolves. The solution is cooled and one mol (106 g.) of cyanogen bromide powder is then added to the cooled catalyst complex and immediately thereafter the addition of 102 cc. (1 mol) of cyclohexene is begun through a dropping funnel with stirring. The cyclohexene is added over a period of ½ hour at 0°–10° C., and the stirring is continued for about 4 hours at 0°–10° C. thereafter and overnight at room temperature. The reaction is then discontinued and the product is poured with stirring over a liter of cracked ice containing a little concentrated hydrochloric acid. The carbon disulfide-product layer is separated from the aqueous layer, the latter extracted with ether, and the ether extract and the carbon disulfide-product layer combined and dried over a desiccant. The product is filtered and 2-bromo-1-cyanocyclohexane and cyanocyclohexene separated therefrom by fractional distillation.

EXAMPLE 13

*Preparation of β-chlorovaleronitrile and pentenonitrile*

A previously prepared, cold solution of 90 g. of anhydrous aluminum chloride, 100 ml. of nitrobenzene, and 26 ml. of cyanogen chloride is poured into a 300 ml. precooled autoclave. The autoclave is sealed, and 56 g. of 1-butene slowly added at a temperature ranging from 20°–35° C. over a period of about 3½ hours. The autoclave is then cooled, vented, and unsealed, and the product removed and poured on a mixture of ice and concentrated hydrochloric acid. The mixture is stirred and extracted with ether. The ether extracts are separated, shaken with a cold sodium hydroxide solution, and dried over a sodium sulfate desiccant. The residual ether and nitrobenzene are removed by distillation, and the remaining product contains β-chlorovaleronitrile and pentenonitrile, which are separated by fractional distillation.

EXAMPLE 14

*Preparation of β-chloropropionitrile and acrylonitrile*

A previously prepared, cold (less than 10° C.) solution of 90 g. of anhydrous aluminum chloride, 75 ml. nitromethane, and 26 ml. (0.5 mol.) of cyanogen chloride is poured into a 300 ml. autoclave, precooled to 0°–10° C. The autoclave is sealed, and 46 g. of ethylene slowly added while maintaining the temperature below 10° C. The addition is preferably carried out over a period of about 3 to 4 hours. The autoclave is then cooled, vented, and unsealed, and the product removed and poured on a mixture of ice and concentrated hydrochloric acid. The mixture is stirred and extracted with ether. The ether extracts are separated, shaken with a cold sodium hydroxide solution and dried over a sodium sulfate desiccant. The residual ether and nitromethane are removed by distillation, and β-chloropropionitrile and acrylonitrile separated from the remaining reaction mass by fractional distillation.

EXAMPLE 15

*Preparation of 3-chloro-2-methylbutyronitrile and 2-methylcrotononitrile*

Nitrobenzene (200 ml.) is added dropwise to 90 g. (0.675 mol) of aluminum chloride. The mixture is stirred rapidly from the beginning. With occasional external cooling by means of a water bath, the temperature is gradually allowed to rise to 55° C., at which point the aluminum chloride completely dissolves, giving a clear orange solution. This solution is then cooled to 0°–5° C., converting it to a thick slurry of solid complex and nitrobenzene. Into this slurry is vaporized 29 ml. (0.55 mol) of cyanogen chloride through a glass tube. Immediately thereafter, 2-butene is bubbled through a sintered glass disc into the mixture as rapidly as possible while still maintaining the temperature of the reaction mass below about 10° C. After about 3 hours the addition of olefin and the stirring are discontinued, and the reaction mass allowed to warm gradually to room temperature. The result is a red solution. This solution is poured on a mixture of crushed ice and concentrated hydrochloric acid, and the result is stirred and allowed to stand for a few minutes, after which the product layer is separated from the aqueous layer. The aqueous layer is then extracted with three 150 ml. portions of ether and the extracts and the product layer combined. This combination is extracted with a dilute sodium hydroxide solution and dried over sodium sulfate to give an orange solution, from which the ether is distilled off. Two fractionations of the residue give a 37% yield (24 g.) of 3-chloro-2-methylbutyronitrile, and a 20% yield (9 g.) of mixed cis- and trans-2-methylcrotononitriles. The total yield of identifiable nitriles is thus 57% (based on cyanogen chloride).

EXAMPLE 16

*Preparation of 3-chloro-2-methylbutyronitrile and 2-methylcrotononitrile*

200 ml. of cold (about 10° C.) nitromethane is saturated with boron trifluoride, with rapid stirring, and about 70 g. of the latter is absorbed. The resulting solution is cooled to about 0°–5° C. and 52 ml. (1 mol) of cyanogen chloride is vaporized into it through a sintered glass disc, with stirring. Excess 2-butene is bubbled through the solution for about 3 hours as rapidly as possible while the reaction mass is maintained at a temperature below 10° C. The stirring and olefin addition are then stopped and the reaction mass allowed to rise slowly to room temperature. The result is an orange solution which is poured on cold water and extracted with ether. The ether extracts are shaken with cold dilute sodium hydroxide solution and fractionated. Yield, 3 g. of 3-chloro-2-methylbutyronitrile, and 5.5 g. of a mixture of cis- and trans-2-methylcrotononitriles.

EXAMPLE 17

*Preparation of 3-chloro-2-methylbutyronitrile and 2-methylcrotononitrile*

100 g. of nitrobenzene is saturated with 10 g. of boron trifluoride and the solution mixed with 164 g. of boron trifluoride etherate. By a procedure similar to that used in the previous example, 1 mol of cyanogen chloride and excess 2-butene are added. Following the recovery method of the previous example, one frame of 3-chloro-2-methylbutyronitrile and one gram of 2-methylcrotononitrile are obtained.

While the invention has been described with particular reference to specific embodiments, it is to be understood that it is not to be limited thereto but is to be construed broadly and restricted solely by the scope of the appended claims.

This application is a continuation-in-part of

U. S. Serial Nos. 88,694 and 88,695, both filed April 20, 1949, both now abandoned.

We claim:

1. The method of preparing a halo-nitrile comprising subjecting an olefin to the action of a member of the group consisting of cyanogen chloride and cyanogen bromide in the presence of a catalyst selected from the group consisting of aluminum chloride-nitrohydrocarbon, aluminum bromide-nitrohydrocarbon, and boron trifluoride-nitrohydrocarbon combinations, at a temperature not substantially exceeding the boiling point of the nitrohydrocarbon.

2. The method of preparing a chloronitrile that comprises subjecting an olefin to the action of cyanogen chloride in the presence of a catalyst selected from the group consisting of aluminum chloride-nitrohydrocarbon, aluminum bromide-nitrohydrocarbon, and boron trifluoride-nitrohydrocarbon combinations, at a temperature not exceeding about 25° C.

3. The method of preparing a β-halo-nitrile that comprises subjecting an olefin to the action of a member of the group consisting of cyanogen chloride and cyanogen bromide in the presence of a catalyst consisting of a combination of aluminum chloride and a nitrohydrocarbon.

4. The method according to claim 3 in which the nitrohydrocarbon is a nitroalkane.

5. The method according to claim 3 in which the nitrohydrocarbon is a nitroaromatic compound.

6. The method of preparing a β-chloronitrile comprising subjecting an olefin to the action of cyanogen chloride in the presence of aluminum chloride and a nitrohydrocarbon, at a temperature not exceeding 25° C.

7. The method according to claim 6 in which the nitrohydrocarbon is a nitroalkane.

8. The method according to claim 6 in which the nitrohydrocarbon is a nitroaromatic compound.

9. The method comprising subjecting a butene to the action of cyanogen chloride at a temperature below 25° C. in the presence of a catalyst comprising aluminum chloride and nitromethane, whereby a methyl chlorobutyronitrile is formed.

10. The method comprising subjecting cyclohexene to the action of cyanogen chloride at a temperature below 25° C. in the presence of a catalyst comprising aluminum chloride and nitromethane, whereby 2-chloro-1-cyanocyclohexane is formed.

11. The method comprising subjecting propylene to the action of cyanogen chloride at a temperature below 25° C. in the presence of a catalyst comprising aluminum chloride and nitromethane, whereby β-chlorobutyronitrile is formed.

12. The method of forming pentenonitriles comprising subjecting a butene to the action of cyanogen chloride at a temperature of at least 25° C. in the presence of aluminum chloride and nitromethane.

13. The method of forming crotononitrile comprising subjecting propylene to the action of cyanogen chloride at a temperature of at least 25° C. in the presence of aluminum chloride and nitromethane.

14. The method of forming an unsaturated nitrile comprising subjecting an olefin to the action of cyanogen chloride in the presence of a catalyst of the group consisting of aluminum chloride-nitrohydrocarbon, aluminum bromide-nitrohydrocarbon and boron trifluoride-nitrohydrocarbon combinations at a temperature of at least 25° C.

FRANK M. COWEN.
JAMES K. DIXON.

References Cited in the file of this patent

UNITED STATES PATENTS

| Number | Name | Date |
|---|---|---|
| 2,402,873 | Coffman et al. | June 25, 1946 |
| 2,419,488 | Dutcher | Apr. 22, 1947 |
| 2,422,859 | Schulze et al. | June 24, 1947 |